Figure 1:
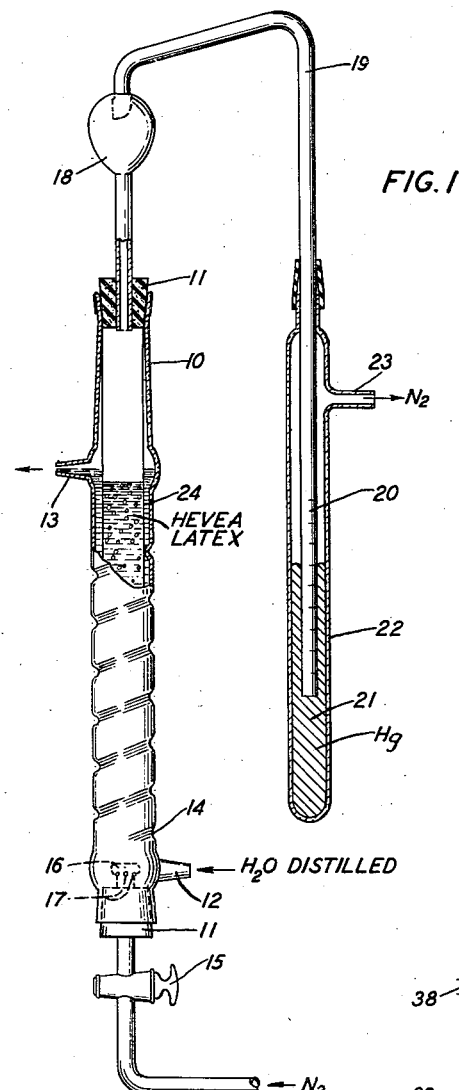

March 17, 1942.   A. R. KEMP ET AL   2,276,986
LATEX
Filed Sept. 9, 1939

INVENTORS: A. R. KEMP
W. G. STRAITIFF
BY
ATTORNEY

Patented Mar. 17, 1942

2,276,986

UNITED STATES PATENT OFFICE 2,276,986

LATEX

Archie R. Kemp, Westwood, N. J., and William G. Straitiff, Kew Gardens, N. Y., assignors to Bell Telephone Laboratories, Incorporated, New York, N. Y., a corporation of New York Application September 9, 1939, Serial No. 294,102

6 Claims. (Cl. 260—821)

This invention relates to latex and more particularly to latex which is substantially unaffected by ordinary coagulating agents.

An object of this invention is to stabilize natural rubber latices and to render them substantially insusceptible of coagulation under a variety of conditions.

Another object of this invention is to combine with natural latex positively charged compounding ingredients and to impregnate effectively wool, silk and other positively charged materials with latex.

A more particular object of this invention is to produce a latex having positively charged rubber particles without the addition of stabilizing agents.

Natural rubber latex, such as that obtained from Hevea brasiliensis, immediately after tapping has a pH approximately 7 and the latex must be maintained slightly alkaline with ammonia or other similar ingredient to prevent coagulation of the rubber particles. For many purposes an acid rubber latex is desired. For example, frequently certain positively charged compounding ingredients could with decided advantage be added to a latex. However, natural latex or ammonia preserved latex coagulates when subjected to these compounding ingredients. Then too, it is impossible to impregnate wool or similar materials with ordinary negatively charged latex. Further, the transportation of latex presents a serious problem. If it is agitated or not maintained at a pH greater than 7, the latex coagulates. While latices have heretofore been proposed which are stabilized by the addition of soap or other materials, these added substances create other objectionable features, such as odor, and increase the water absorption of the rubber derived from them.

In accordance with this invention rubber latex is prepared which is stable upon the addition of acids even when subjected to agitation. Positively charged compounding ingredients, such as carbon black, may be added to this latex without the danger of coagulation. Such latex may be employed for the impregnation of wool or silk. It is substantially free from water soluble substances, is more stable towards coagulating agents and heat, and is freer from bacterial action than the latex stabilized by added materials. Further, rubber derived from the latex of this invention absorbs considerably less water than that derived from latex stabilized by means of stabilizing agents. The latex of this invention is produced by removing substantially all of the salts and other water soluble ingredients from natural latex. Preferably, this removal is accomplished by dialysis and the dialysis is continued until the natural ash content which is a direct index of the salts in the latex, is not more than .15 per cent of the total solids in the latex. This amount of ash content is critical. If an amount of natural ash greater than .15 per cent of the total solids is present in the latex, coagulation occurs when the pH of the latex approaches the isoelectric point of the protein of the latex. On the other hand if an acid, such as acetic acid, is added to latex in which the natural ash content is not greater than .15 per cent of the total solid present so that the hydrogen ion concentration passes through and is below the isoelectric point of the proteins in the latex, no coagulation occurs over a period of months. In addition to the advantages of employing the latex of this invention having positively charged rubber particles, the substantial absence of water soluble materials renders it admirably adaptable for use in situations wherein negatively charged latex is now utilized and in which a resulting rubber having low water absorption properties is desired.

Figure 2:
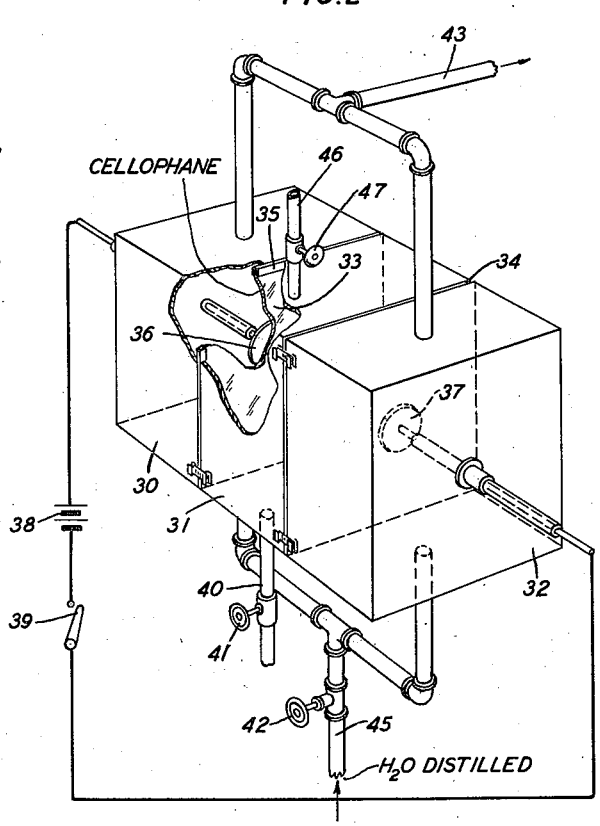

A more comprehensive understanding of this invention is obtained by reference to the accompanying drawing, in which:

Fig. 1 is a diagrammatic view, partly in section, of an apparatus for preparing the latex of this invention by simple dialysis; and Fig. 2 is a perspective view, partly broken away, of a system for the production of the latex of this invention by electrodialysis.

In Fig. 1 an elongated tube 10 has flanged ends adapted to accommodate rubber stoppers 11. The tube 10 slightly above the lower flanged end is equipped with an inlet tube 12, while an outlet tube 13 is located near the upper flanged end of the tube 10. The tube has a recession 14 made in barber pole fashion for a short distance from the lower end of the tube 10 to about one-third of the distance from the top. A stop-cock 15 is inserted in the lower rubber stopper 11. One end of the stop-cock 15 is blown into a small bulb 16 and perforated with small orifices 17 on the under-side of the bulb. The other end of the stop-cock 15 is connected to a source of nitrogen gas, not shown. A trap 18 is inserted in the upper rubber stopper 11. The trap is connected by means of a tube 19 to a graduated tube 20 immersed in a body of mercury 21 contained in a reservoir 22. The reservoir 22 has an outlet tube 23 from which the nitrogen escapes after passage from the tube 20 through the body of mercury 21. A membrane 24 comprising, for example, regenerated cellulose or Cellophane, is contained within the elongated tube 10 and held in place by means of the rubber stoppers 11. The tube 20 is preferably graduated in centimeters in order to ascertain the pressure of the nitrogen in the apparatus. Since in the dialysis the latex contained in the membrane 20 is diluted due to osmosis, the pressure of the nitrogen is preferably maintained at a value to counteract that due to osmosis. In this apparatus, a pressude of 3 to 6 centimeters of mercury has been found to be satisfactory. The rubber latex is placed within the casing 24. Preferably, the casing 24 is permitted to remain in water for several minutes before insertion within the tube 10. The ends of the casing are opened and slipped back over the ends of the tube and the rubber stopper 11 containing the stop-cock 15 is inserted in the bottom of the tube 10 and gently pushed forward. In this manner the casing 24 is held tightly between the inner wall of the flange and the rubber stopper 11. The slackened casing is then tightened by sliding the end of the casing further back on the top flange of the tube 10. Once the casing is in place and permitted to dry there is no slackening upon the entrance of the rubber stopper 11 containing the trap 18.

With the stop-cock 15 closed the latex is poured into the casing 24 until the level of the liquid is even with the outlet tube 13. Provision is made for a space above the latex in the casing 24 for the foam which is formed during the first few hours of dialysis. The stop-cock 15 is then opened and nitrogen or other inert gas permitted to flow through the apparatus. This procedure serves to remove the air from within the apparatus, supply the necessary agitation and force the membrane casing 24 against the recession or indentations 14. Distilled water or ammonia water substantially free from salts is supplied through the inlet tube 12 and is withdrawn from the outlet tube 13. The water is introduced into the tube 12 at the rate from approximately 1 to 2 gallons per period of twenty-four hours. During the course of the dialysis the level of the body of mercury 21 may be adjusted as required. The regenerated cellulose membrane or casing 24 is extremely durable and is capable of withstanding pressure as high as 15 centimeters of mercury for several days. The latex in the casing 24 is dialyzed until the natural ash content is not greater than .15 per cent of the total solids in the latex.

Typical dimensions of the principal parts of the apparatus for the dialysis of latex shown in Fig. 1 are as follows: tube 10—outside diameter 31 millimeters and 350 millimeters in length with ends flanged to fit a No. 5 stopper; the indentations 14 are approximately 3 millimeters in depth and about 20 millimeters apart from a distance of 45 millimeters from the bottom of the tube to about 105 millimeters from the top; the diameter of tube of the stop-cock is 2 millimeters.

In a typical example a latex approximately one month old was placed in the casing 24 and distilled water containing 1 per cent ammonia was passed through the apparatus at the rate of 1 gallon per period of twenty-four hours. A nitrogen pressure of 6 centimeters of mercury prevented dilution for the first forty-eight hours, while a pressure corresponding to 3 centimeters of mercury was sufficient thereafter. The first of the dialyzing water was tinted a light brown color by some of the dialyzable serum substances. The tendency for the latex to form a stable foam prevented a continual passage of nitrogen through the system until after seventy-two hours. The latex was almost pure white and behaved normally towards latex coagulants.

After seventy-two hours, distilled water was passed through the apparatus. Dialysis was continued for an additional twenty-four hours. At the end of this period the latex coagulated slowly upon the addition of small amounts of acids. The coagulum which formed was very spongy and closely resembled a fresh latex coagulum.

Dialysis with distilled water was contained for another forty-eight hours. At the end of this period the dialyzed latex possessed no evidence of bacterial activity. The latex was stable towards coagulation by organic acids such as acetic acid, and organic coagulants such as alcohols. When made strongly acidic the latex did not coagulate or undergo putrefaction after standing several months. Coagulation does not occur when this latex is heated and film formation due to surface evaporation is prevented by agitation. The dry constituents of the dialyzed latex analyzed; natural ash, 0.12 per cent; nitrogen 0.6 per cent; acetone extract, 3.9 per cent. The amount of diffusible matter comprised 8.7 per cent by weight of the total solids.

It has been found that if the natural ash content is greater than .15 per cent of the total solids in the latex, coagulation occurs when such latex is subjected to organic acids. Accordingly it is important that the salts be removed until this value is not exceeded.

The total solids from the dialyzed latex has a considerably faster rate of cure than commercial crepe rubber. This faster rate of cure of the total solids derived from dialyzed latex is due to the retention of the natural colloidal accelerators in the rubber.

An acid latex or one having positively charged rubber particles is preferably prepared from the dialyzed latex of this invention by simply adding an organic acid, such as formic or acetic acid, or an inorganic acid, such as hydrochloric acid or sulphuric acid, until the hydrogen ion concentration is of the order of below pH 3.5 or lower. The acid may be added slowly, if desired, without the danger of coagulation. This latex is stable against heat and agitation.

A latex having negatively charged rubber particles is produced from the dialyzed latex by adding a base, such as ammonium hydroxide, until the hydrogen ion concentration is above pH 8. This resulting latex is extremely stable and is relatively immune to bacterial action.

In Fig. 2, apparatus for the electrodialysis of latex is illustrated. This apparatus comprises three chambers 30, 31 and 32. Between the chambers 30 and 31 and between the chambers 31 and 32 membranes 33 and 34 are located, respectively. These membranes may be of any material such as regenerated cellulose or parchment paper which, while permitting the flow of water soluble materials therethrough, do not allow the passage of the rubber particles of latex. The membranes 33 and 34 are preferably attached to a frame, as, for example, the membrane 33 is attached to the frame 35. Electrodes 36 and 37 of opposite polarity are located, respectively, in chambers 30 and 32. These electrodes are supplied from a source of current 38 through a switch 39. Latex is supplied to the chamber 31 through a pipe or conduit 46 and valve 47 and is withdrawn from the chamber 31 by means of a pipe or conduit 40 and valve 41. Distilled water or tap water passes from a pipe or conduit through a valve 42 to the chambers 30 and 32 and is withdrawn from these chambers through the outlet pipe 43.

Latex is introduced into the chamber 31 through the conduit 46 until the chamber is about three-quarters filled. Water passes through the chambers 30 and 32 from the pipe 45 at the rate of about 5 gallons for each eight-hour period. The switch 39 connects the source of current 38 to the electrodes 36 and 37. A potential gradient of approximately 10 volts per centimeter is desirable for this purpose. After the latex in the chamber 31 has been dialyzed so that the ash content thereof based upon the total solids, is not greater than .15 per cent, the latex is withdrawn through the pipe 40 and valve 41.

It is important that the natural ash content of the latex based upon the total solids be not greater than .15 per cent. If the ash content does exceed this value coagulation with acids, such as acetic acid, occurs. If the ash content does exceed this value the latex may be subjected to acids to reduce the pH below 3.5 and coagulation does not occur over a period of months.

In the apparatus shown in Fig. 2, the rate of diffusion of the ash constituents of the latex is increased markedly over that of the latex processed in the apparatus illustrated in Fig. 1. This increased rate of diffusion is caused by the greater velocity of migration of the ions. Consequently the dialysis of the latex until the natural ash constituents are not greater than .15 per cent of the total solids may be achieved in a considerably shorter period of time than with the apparatus shown in Fig. 1. A period of approximately eight hours has been found satisfactory for this purpose. A larger potential gradient than 10 volts per centimeter causes latex to cream and concentrate in the vicinity of the membrane adjacent to the positive pole. Excessive potential causes the formation of a film of rubber in the membrane adjacent to the positive pole. This condition impedes the diffusion of the ions and continued dialysis under these circumstances is no longer feasible. Accordingly it is preferable to maintain the potential gradient at approximately 10 volts per centimeter.

To prevent dilution due to osmosis, a gas pressure may conveniently be applied to the chamber 31. Nitrogen or other inert gas may be used for this purpose.

The natural ash constituents or content described in the application and defined in the appended claims is the residue resulting from the ignition of the total solids in the natural dialyzed latex. It is derived substantially from the soluble salts dissolved in the latex serum. This invention is applicable to all natural rubber latices, the stability of which is due to protein protection colloids. In the practice of this invention, the salts which accelerate coagulation in the presence of other substances by decreasing the colloidal stability of the protein protective colloid are substantially removed. More particularly, the dialysis or other equivalent process is continued until the natural ash content, which is a direct index of the soluble salts in the latex, does not exceed .15 per cent of the total solids.

The ash content of the total solids of the latex may be reduced below the critical value by means other than dialysis. For example, filtration or centrifuging, may be employed to effect this end.

While preferred embodiments of this invention have been illustrated and described, various modifications may be made therein without departing from the scope of the appended claims.

What is claimed is:

1. The method of producing an improved latex which comprises removing salts from a natural latex until the natural ash content does not exceed .15 per cent of the total solids of said latex and reducing the pH of the latex to below about 3.5.

2. A natural latex having a pH below 3.5 and a natural ash content which does not exceed .15 per cent of the total solids of said latex.

3. An uncoagulated latex having a pH less than 3.5 which contains substantially all of the colloids of the latex from which it was derived and substantially no salts.

4. The method of producing a stabilized latex which comprises dialyzing a natural latex until the natural ash content does not exceed .15 per cent of the total solids of said latex and reducing the pH of the dialyzed latex to below 3.5.

5. The method of producing a stabilized latex which comprises dialyzing a natural latex until the natural ash content does not exceed .15 per cent of the total solids of said latex and adjusting the pH of the latex until a positive electric charge is produced on the solid particles of the latex.

6. A natural latex having an ash content which does not exceed .15 per cent of the total solids of the latex and having a pH lower than that corresponding to the isoelectric point of the proteins of the latex.

ARCHIE R. KEMP.
WILLIAM G. STRAITIFF.